United States Patent [19]

Huard

[11] 3,764,921

[45] Oct. 9, 1973

[54] SAMPLE AND HOLD CIRCUIT

[75] Inventor: George Phillip Huard, St. Paul, Minn.

[73] Assignee: Control Data Corporation, Minneapolis, Minn.

[22] Filed: Oct. 27, 1972

[21] Appl. No.: 301,385

[52] U.S. Cl. .................. 328/151, 307/240, 307/246, 307/251, 307/297, 328/165

[51] Int. Cl. ...... H03k 5/18, H03k 17/30, H03k 1/14

[58] Field of Search .................... 307/235 R, 235 A, 307/246, 251, 297, 240; 328/126, 151, 165

[56] References Cited

UNITED STATES PATENTS

| | | | |
|---|---|---|---|
| 3,435,257 | 3/1969 | Lawrie, Jr. | 307/247 X |
| 3,387,222 | 6/1968 | Hellwarth et al. | 307/246 X |
| 3,448,293 | 6/1969 | Russell | 307/251 |
| 3,538,349 | 11/1970 | Smith | 307/251 X |
| 3,610,953 | 10/1971 | Gordon et al. | 307/251 X |
| 3,633,044 | 1/1972 | Buckstad | 330/145 X |

FOREIGN PATENTS OR APPLICATIONS

| | | | |
|---|---|---|---|
| 1,762,420 | 4/1970 | Germany | 307/251 |

OTHER PUBLICATIONS

Hearn, "Applications for Fast Slewing OP Amps" Elect. Products Magazine, p. 54–55, June 21, 1971.

*Primary Examiner*—John W. Huckert
*Assistant Examiner*—L. N. Anagnos
*Attorney*—Robert M. Angus et al.

[57] ABSTRACT

A sample and hold circuit, having a gate-operable switching device connected between an input and an output, a storage capacitor for storing signals, and a pulse generator for switching the switching device, is provided with a bias circuit for continuously biasing the switching device to a level immediately below the switching level.

11 Claims, 1 Drawing Figure

PATENTED OCT 9 1973 3,764,921
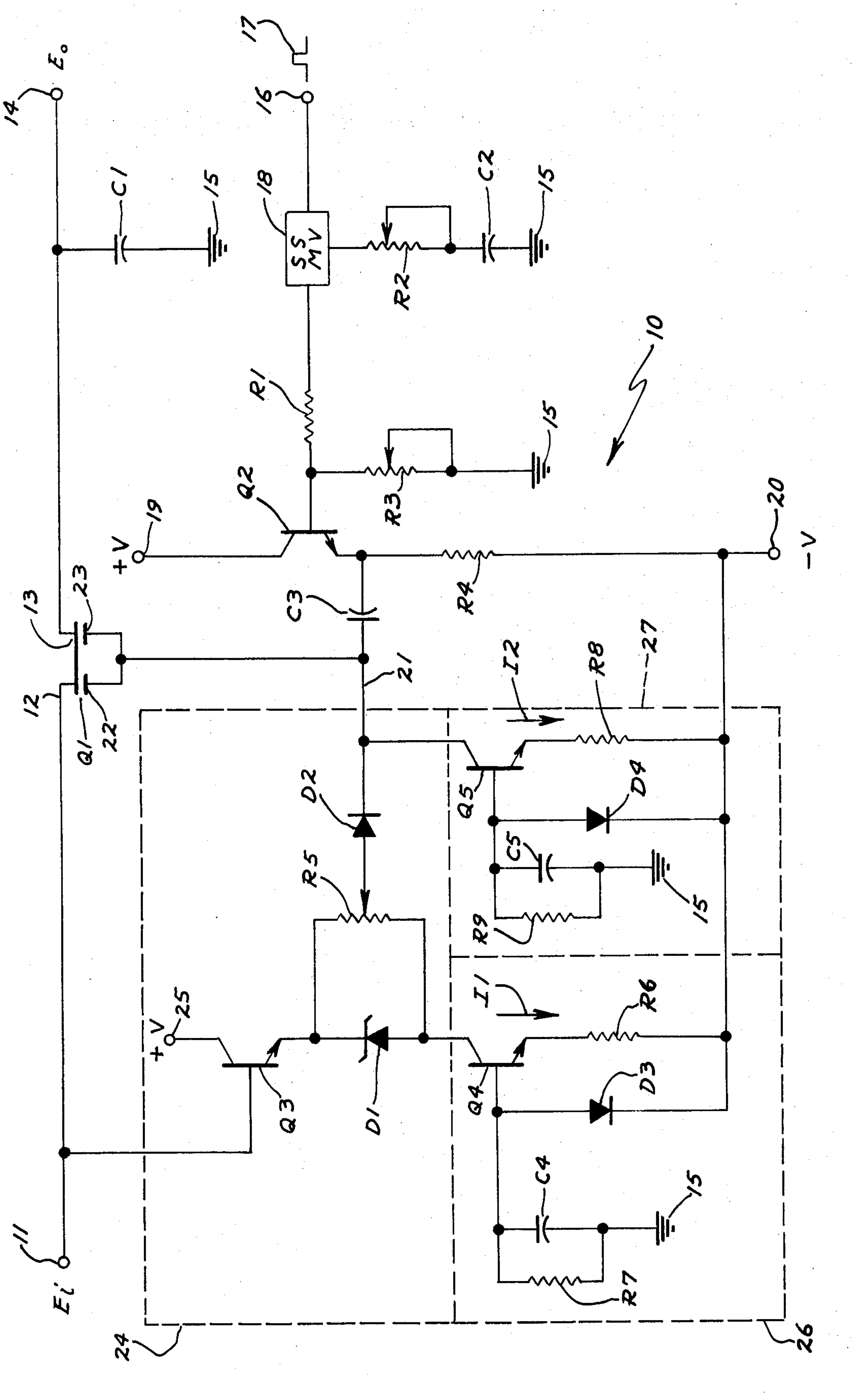

SAMPLE AND HOLD CIRCUIT

This invention relates to sample and hold circuits, and particularly to sample and hold circuits having means for preventing application of clock pulses to the sampled signal.

Sample and hold circuits ordinarily include a gated switching device connected between an input and an output and a hold capacitor connected to the switching device and to the output to store signals passed by the switching device. In operation, the switching device is gated by a suitable clock pulse to sample a signal, for example a voltage amplitude, appearing at the input and to pass the sampled signal to be stored in the hold capacitor. The sampled signal may thereafter be applied to a utilization device connected to the output of the circuit. One problem associated with prior sample and hold circuits resided in the fact that the clock pulse applied to the gated switching device often affected the switching device causing a variation in the sample signal by virtue of the capacitance between the elements of the switching device. Numerous attempts have been made to isolate the holding capacitor from the effects of the clock pulse and to compensate the holding capacitor against fluctuations in the sampled signal caused by the clock pulse. However, these techniques have not been altogether successful, and have resulted in elaborate, more costly circuitry associated with the sample and hold circuit.

It is an object of the present invention to provide an improved sample and hold circuit wherein a means is provided for minimizing the effects of the clock pulses on the gated switching device.

Another object of the present invention is to provide a sample and hold circuit wherein the gated switching device is biased to a level immediately below the switching level so that the effect of clock pulses on the gated switching device is minimized.

In accordance with the present invention, a sample and hold circuit is provided having means connected to the input for biasing the gate of a gated switching device to a level immediately below the switching level of the switching device. A clock applies clock pulses to the gate of the switching device to switch the switching device between a conductive and non-conductive condition so that input signals applied to the input are applied to a hold capacitor for application to an output.

One feature of the present invention resides in the provision of current regulators for continuously regulating the bias signal at the gate of the switching device.

The above and other features of this invention more fully understood from the following detailed description and the accompanying drawing in which the sole FIGURE is a circuit diagram of a sample and hold circuit in accordance with the presently preferred embodiment of the present invention.

Referring to the drawing, there is illustrated a sample and hold circuit 10 in accordance with the presently preferred embodiment of the present invention. Circuit 10 includes an input terminal 11 connected to the source 12 of switching device Q1. Drain 13 of device Q1 is connected to output terminal 14 and to one side of capacitor C1. The opposite side of capacitor C1 is connected to ground 15. Terminal 16 is connected to receive a pulse 17 and provides an input to single shoot multivibrator 18. Multivibrator 18 produces a series of clock pulses which are applied through resistor R1 to the base of npn transistor Q2. Preferably, variable resistor R2 is connected in series with capacitor C2 between multivibrator 18 and ground 15 to adjust the width of clock pulses from multivibrator 18. Also, variable resistor R3 is connected between the base of transistor Q2 and ground 15 to adjust the amplitude of clock pulses provided to the base of transistor Q2.

Transistor Q2 is connected in an emitter-follower relation having its collector connected to a DC supply at terminal 19. The emitter transistor Q2 is connected through load resistor R4 to terminal 20, connected to the negative side of the DC power supply. The emitter of transistor Q2 is also connected through capacitor C3 to lead 21. Lead 21 is connected to gates 22 and 23 of switching device Q1. Preferably, switching device Q1 is a dual gate field effect transistor (FET) capable of switching between a conducting and non-conducting condition between source 12 and drain 13.

Bias circuit 24 is connected between input terminal 11 and lead 21. The bias circuit includes npn transistor Q3 connected in emitter-follower relationship and having its base connected to input terminal 11. The collector of transistor Q3 is connected via terminal 25 to the positive side of the DC power supply and its emitter is connected via zener diode D1 to current regulator 26. Variable resistor R5 is connected in parallel with diode D1 and has its center tap connected to the anode of diode D2. The cathode of diode D2 is connected to lead 21. A first current regulator 26 is connected to the anode of zener diode D1. A second current regulator 27 is connected to lead 21.

Current regulator 26 is a constant current source comprising npn transistor Q4 having its collector connected to the anode of diode D1 and having its emitter connected through resistor R6 to terminal 20. Diode D3 is connected between the base of transistor Q4 and terminal 20. Also, resistor R7 and capacitor C4 are connected in parallel between the base of transistor Q4 and ground 15. Likewise, current regulator 27 is a constant current source comprising npn transistor Q5 having its collector connected to lead 21 and its emitter connected through resistor R8 to terminal 20. Diode D4 is connected between the base of transistor Q5 and termianl 20, and resistor R9 and capacitor C5 are connected in parallel between the base of transistor Q5 and ground 15.

Prior sample and hold circuits which utilized FET switching devices ordinarily applied clock pulses to the gate which alternated between a ground, or zero, level and the switching level. The switching level, sometimes called the pinch-off voltage, is at some level below the voltage appearing at the source of the FET. Hence, the clock pulses had an amplitude of:

$E_g > E_p$ where $E_g$ is the gate amplitude for switching as produced by the clock pulses and $E_p$ is the pinch-off voltage. Since the source voltage varies with the sampled input signal, and the pinch-off voltage is ordinarily some level below the source voltage, e.g., $E_s - 2$v., prior circuits required that the pulse amplitudes applied to the gate had to be sufficient to switch the FET for maximum tolerable input signals, and the pulse depth had to be sufficiently low to cut off the FET for minimum input signals. Hence, the clock voltage amplitude often greatly exceeded the source voltage amplitude. For example, if the pinch-off voltage, $E_p$, for an FET is about 2 volts below $E_s$, the clock had to supply pulses greater than about 2 volts below the maximum input voltage, with a minimum level less than 2 volts below the minimum input voltage. Consequently, for circuits designed to sample signals in a 10 volt range, the pulse signals had to be more than 10 volts above a minimum level.

It is known that the source-to-gate capacitance of an FET is quite large. Consequently, in prior circuits, the leading edges of the clock pulses were AC coupled to the source-to-drain conductive path of the FET, thereby inducing an additonal signal onto the signal passing between the source and drain. Further, if the clock pulse amplitude greatly exceeded the source amplitude, a signal could be induced onto the input signal, thereby effectuating an erroneous signal output. Prior circuits compensated for this additional signal in numerous elaborate manners, but none have successfully eliminated their additonal signal.

The present invention substantially eliminates the effects of the clock pulses by continuously biasing the FET gate to a level immediately below the switching level and by utilizing clock pulses whose amplitude is merely sufficient to raise the gate voltage above the switching level, and preferably to the same level as the source terminal to isolate the gate from the source-to-drain circuit. Thus, $E_g, = E_s$, $E_b \leq E_p$ and $E_b + E_c = E_g$, where $E_c$ is the clock pulse amplitude and $E_b$ is the bias voltage amplitude. It is evident, therefore, that if the bias signal $E_b$ is established at a predetermined level below the pinch-off voltage $E_p$, $E_c \geqslant E_s - E_p$. Thus, if $E_p$ is 2 volts below $E_s$, $E_c \geq 2$ volts, thereby maintaining a minimal pulse amplitude to switch the FET.

In operation of the apparatus shown in the drawings, the source-to-drain impedance of field effect transistor Q1 is very high (i.e., Q1 is off) when the signal appearing at gate 23 is less than about two volts below the signal appearing at source 12. The source-to-drain impedance becomes low (i.e., Q1 conducts) when the signal appearing at gate 23 rises to above about two volts below the signal appearing at source 12. Thus, if the voltage appearing at input terminal 11 is $E_i$, transistor Q1 will conduct when the voltage at gate 23 is greater than $E_p$ and will not conduct when the voltage at gate 23 is less than $E_p$. The circuitry associated with bias control circuit 24 and current regulator 26 and 27 maintain the voltage at gate 23 at just below $E_p$. Current regulator 26 provides a sink for current flowing in the direction of arrow 11 from the power supply from terminal 25 through diode D1 to terminal 20.

The input signal $E_i$, is impressed on the base of transistor Q3 so that the input voltage appears across the serial connection of the base-to-emitter circuit of transistor Q3, zener diode D1 is parallel with resistor R5 and current regulator 26. Zener diode D1 provides a constant voltage drop which is tapped by the center tap on resistor R5. Resistor R5 is adjusted so that the voltage $E_b$, appearing at the anode of diode D2 is slightly less than 2 volts below $E_i$. Hence, the voltage drop across the base-to-emitter circuit of transistor Q3 and across zener diode D1 and resistor R5 to the center tap, is about 2 volts. Current regulator 27 provides a sink for current flowing in the direction of arrow I2 through diode D2.

A trigger pulse 17 is applied to input terminal 16 of single shot multivibrator 18. The pulse width of the output clock pulses from multivibrator 18 is adjusted by regulating variable resistor R2, and the amplitude of output clock pulses from multivibrator 18 is adjusted by selectively regulating resistor R3. The output clock pulses from multivibrator 18 are applied to emitter follower transistor Q2 to raise the voltage at the emitter of transistor Q2 which in turn is applied to capacitor C3 to raise the voltage on line 21 to the switching level of transistor Q1 to cause the transistor to conduct. The amplitude of the clock pulses may be quite small, e.g., 2 volts, as compared to the input voltage $E_i$, so the leading edge of the pulse applied to the gates of transistor Q1 is small, thereby minimizing the AC coupling and the effect of the capacitance between the gate and the source of transistor Q1. The gate-to-source and source-to-drain capacitances are quite large compared to that between the gate and drain of transistor Q3 so that the trailing edge of the pulse applied to the gate of transistor Q1 is not AC coupled to the sampled signal and therefore does not affect it. Resistor R5 is adjusted so that the cathode of diode D2 is at a level below the switching level of transistor Q1 when transistor Q2 is off. Resistor R3 is adjusted so that the voltage appearing on lead 21 when transistor 21 is conducting is equal to the input voltage $E_i$, thereby completely eliminating coupling between the gate and source of transistor Q1. As a result of the adjustment of resistors R3 and R5, the effect of the clock pulses on the input signal, $E_i$, passing through transistor Q1 to holding capacitor C1 is completely eliminated. Thus, the input signal $E_i$ is transferred to capacitor C1 during the period of time determined by the width of the clock pulse. The input signal is stored in the holding capcitor C1 for storage therein and operation on output circuitry connected to output terminal 14.

One feature of the present invention resides in the fact that the bias signal from bias circuit 24 is continuously impressed through diode D2 to the gates 22 and 23 of transistor Q1. When a clock pulse is produced by multivibrator 18, transistor Q2 and capacitor C3, the pulse is added to the bias signal and is not reflected back through the bias circuit by virtue of diode D2.

The present invention thus provides an improved sample and hold circuit wherein the effect of clock pulses on the switching is substantially eliminated. The present invention is effective in operation and requires minimal maintenance or readjustment. Simple adjustments of resistors R2, R3 and R5 enables the circuit to provide effective sample and hold operation for digital-to-analog applications as well as many other purposes.

This invention is not to be limited by the embodiment shown in the drawing and described in the description, which is given by way of example and not of limitation, but only in accordance with the scope of the appended claims.

What is claimed is:

1. In a sample and hold circuit having an input adapted to be connected to a source of electric signals, an output, storage means connected to said output for storing said electric signals, a gated switching device connected between said input and said storage means for applying said electric signals to said storage means, and pulse generator means connected to a gate of said gated switching device for selectively operating said gated switching device between conducting and non-conducting states, the improvement comprising: bias means connected to said gate for continuously biasing said gated switching device to a level below the switching level of said gated switching device, said bias means including voltage regulator means comprising a transistor having its base connected to said input to receive said electric signals from said source and its collector connected to a source of power, and voltage drop means connected between the emitter of said transistor and said gate, said voltage regulator means providing a predetermined voltage drop between said input and said gate.

2. Apparatus according to claim 1 further including current regulator means connected to said voltage drop means for dissipating current flowing therethrough.

3. Apparatus according to claim 2 wherein said voltage drop means comprises a zener diode having its cathode connected to said emitter of said transistor and having its anode connected to said current regulator means, a resistor connected in parallel to said zener diode, and tap means connected to a midpoint of said resistor and to said gate.

4. Apparatus according to claim 3 further including a diode connected between said tap means and the junction between said pulse generator and said gate to pass current from said tap means to said junction, and second current regulator means connected to said junction for dissipating current flowing through said last-named diode.

5. Apparatus according to claim 1 wherein said voltage drop means includes a zener diode.

6. Apparatus according to claim 5 wherein said pulse generator means generates pulses having amplitudes approximately equal to said predetermined voltage drop.

7. Apparatus according to claim 1 further including a diode connected between said voltage drop means and the junction between said pulse generator and said gate to pass current from said voltage drop means to said junction, and current regulator means connected to said junction for dissipating current flowing through said diode.

8. Apparatus according to claim 1 wherein said pulse generator means generates pulses having amplitudes approximately equal to said predetermined voltage drop.

9. In a sample and hold circuit having an input adapted to be connected to a source of electric signals, an output, storage means connected to said output for storing said electric signals, a gated switching device connected between said input and said storage means for applying said electric signals to said storage means, and pulse generator means connected to a gate of said gated switching device for selectively operating said gated switching device between conducting and non-conducting states, the improvement comprising: bias means connected to said gate for continuously biasing said gated switching device to a level below the switching level of said gated switching device, said bias means including voltage regulator means connected to said input to receive electric signals from said source, said voltage regulator means providing a predetermined voltage drop between said input and said gate, and current regulator means connected to said voltage regulator means for dissipating current flowing through said voltage regulator means.

10. Apparatus according to claim 9 further including a diode connected between said voltage regulator means and the junction between said pulse generator means and said gate to pass current from said voltage regulator means to said junction, and second current regulator connected to said junction for dissipating current flowing through said diode.

11. Apparatus according to claim 9 wherein said pulse generator means generates pulses having amplitudes approximately equal to said predetermined voltage drop.

* * * * *